United States Patent
Knirsch et al.

(10) Patent No.: US 6,959,243 B2
(45) Date of Patent: Oct. 25, 2005

(54) METHOD FOR OPERATING AN INTERNAL COMBUSTION ENGINE

(75) Inventors: Matthias Knirsch, Schwieberdingen (DE); Alexander Hinz, Markgroeningen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/760,371

(22) Filed: Jan. 21, 2004

(65) Prior Publication Data

US 2004/0149024 A1 Aug. 5, 2004

(30) Foreign Application Priority Data

Jan. 21, 2003 (DE) ................................ 103 02 054

(51) Int. Cl.$^7$ ........................................... G01M 15/00
(52) U.S. Cl. ..................................................... 701/114
(58) Field of Search .................................. 701/114, 35

(56) References Cited

U.S. PATENT DOCUMENTS

| 4,757,463 | A | * | 7/1988 | Ballou et al. ................. 701/35 |
| 4,853,850 | A | * | 8/1989 | Krass et al. .................. 701/35 |
| 6,115,654 | A | * | 9/2000 | Eid et al. ...................... 701/35 |
| 6,226,576 | B1 | | 5/2001 | Torno et al. |

* cited by examiner

*Primary Examiner*—Andrew M. Dolinar
(74) *Attorney, Agent, or Firm*—Walter Ottesen

(57) ABSTRACT

A method for operating an internal combustion engine such as an internal combustion engine of a motor vehicle is disclosed. The method includes the steps of: checking the operability of at least one component by a diagnostic function (D); causing the diagnostic function (D) to transmit data (CB) that the diagnostic function (D) could have found a fault to a central function (CF) in a format uniform for all diagnostic functions (D); and, causing the central function (CF) to process the data (CB).

8 Claims, 2 Drawing Sheets

METHOD FOR OPERATING AN INTERNAL COMBUSTION ENGINE

CROSS REFERENCE TO RELATED APPLICATION

This application claims priority of German patent application no. 103 02 054.3, filed Jan. 21, 2003, the entire content of which is incorporated herein by reference.

FIELD OF THE INVENTION

The invention relates to a method for operating an internal combustion engine including an engine in a motor vehicle. In the method, the operability of at least one component is checked by a diagnostic function.

BACKGROUND OF THE INVENTION

A method of the above kind is disclosed, for example, in U.S. Pat. No. 6,226,576. In this patent, a method for monitoring and fault detection is described. Here, one distinguishes between such diagnostic functions which run through during the normal operation of the engine and monitor the function of a component and such diagnostic functions which actively influence a component and so determine the operability thereof.

Because of the statutory requirements of the California Air Resource Board (CARB), the running behavior or the running capability of diagnostic functions must be documented in everyday use in all future motor vehicles. In this way, the protection against failure, especially of environmentally critical components, is to be once again improved. For the fault diagnosis of specific components, a specific frequency of a fault identifying capability must be shown. The frequency of a fault identifying capability of a fault diagnosis is documented by a quotient in whose numerator a number of detected possibilities of a fault detection is present and, in whose denominator the number of time intervals is present in which specified driving conditions were present which are required for the diagnosis of specific components. This quotient is characterized as an in-use-monitor-performance-ratio.

SUMMARY OF THE INVENTION

It is an object of the invention to satisfy the requirements of the California Air Resource Board with respect to the showing of a fault identifying capability of fault diagnoses and, on the other hand, to provide the greatest possible flexibility with respect to programming.

The method of the invention is for operating an internal combustion engine including an internal combustion engine of a motor vehicle. The method includes the steps of: checking the operability of at least one component by a diagnostic function (D); causing the diagnostic function (D) to transmit data (CB), that the diagnostic function (D) could have found a fault, to a central function (CF) in a format uniform for all diagnostic functions (D); and, causing the central function (CF) to process the data (CB).

With the use of a central function for the processing of information as to whether a diagnostic function could have been executed, a high flexibility is obtained in that the most different diagnostic functions can be connected to the central function without complex changes of the central function being needed. Required adaptations to statutory changes can be carried out centrally in the central function. The central function can also fit easily into existing structures and remains adaptable also for future requirements. The central store of the results or data of the diagnostic functions in the central function makes possible the use of already existing mechanisms for the processing of the data as to whether a diagnosis could have been carried out.

Because of the unitary format, any desired diagnostic functions can be connected without adaptations being required.

In a first advantageous embodiment of the method of the invention, it is suggested that each diagnostic function communicates with the central function via an interface and that the central function establishes for each diagnostic function, which identifies itself to the central function at the interface, a region of a suitable data structure (a so-called record), wherein data from and for the particular diagnostic function are stored. A parameter is specified and used via which it is recognized that a record must be established. In the central function, no data at all must at first be present as to which diagnostic functions should actually be monitored. In lieu thereof, a corresponding record is established automatically for each diagnostic function which uses the interface (and, if needed, the specific parameter) in a plug and play method. This method is therefore very flexible and can be used without complex new programming for the most different internal combustion engines and built-in situations.

To make this more specific, it is suggested that, in the record, the following is stored: an identifier of the diagnostic function, data as to whether the diagnostic function could have been run and data as to whether the diagnostic function is blocked or may run. These data are especially important for the monitoring of the running capability of a diagnostic function. One recognizes immediately that an interface of this kind is narrow and therefore can be easily programmed.

A further embodiment of the method of the invention is characterized in that the central function detects whether specific operating conditions of the engine are satisfied which are conditions precedent for the running of the diagnostic function and that the central function determines a first count value which is based on the number of possible runs of the diagnostic function and determines a second count value which is based on the number of the specific operating conditions which actually were present.

In this way, the fact is taken into account that it is necessary for the execution of many diagnostic functions that the engine and, if required, a motor vehicle, in which the engine is built in, is in a specific operating state while the diagnostic function runs. Even though diagnostic functions in part can run only at specific operating conditions, it is required for an optimal monitoring of all components that all diagnostic functions (for general drive conditions) are capable to run at least with a specific frequency or probability.

According to American statutory requirements, one proceeds from the situation that such general driving conditions are, for example, present when: the engine was in operation at least 600 seconds; during the total driving operation, at least during 300 seconds, a speed of at least 25 miles per hour was reached; and, the engine had run at least once 30 seconds at a time in idle. If such specific operating conditions never even have been present, it is not, in principle, assumed that specific diagnostic functions could have at all been carried out.

This, however, does not mean that the diagnostic function may not actually be run but this is simply not expected. Here, it must be kept in mind that it is the target of the logging according to the invention to determine the frequency with which a fault could have been found. In this sense, a confirmation of a functioning component via a "good test" is not sufficient. For this reason, it is required that a "bad test" could have been carried out at the given driving conditions and also even when the component is okay. The above-described further embodiment of the method of the invention increases finally the accuracy for the determination of the running capability of a diagnostic function.

It is also suggested that, in the central function, an execution of the diagnostic function and a change of the second count value are blocked by a common functionality when a component, which is required for achieving a purposeful diagnostic result, is defective. In this way, the case is considered that a diagnostic function can be executed but supplies possibly an incorrect result because a component, for example, a sensor, whose signal is to be evaluated by the diagnostic function, is defective. When such a case is present, the actual result with respect to the executability of the diagnostic function is "frozen" by the method of the invention. Furthermore, the actual execution of the diagnostic function is blocked in order to avoid false fault diagnosis results. Both are made possible by a common functionality, for example, a block bit. The corresponding interface continues therefore to remain narrow.

According to another embodiment of the method of the invention, a third count value is determined in the central function which is based on the number of the specific operating conditions which have actually been present. The third count value is therefore not blocked in a defective component; instead, the count value is incremented each time when the specific operating conditions have been present. In this way, it can be determined from a comparison of the second count value to the third count value that the execution of the diagnostic function and the incrementing of the second count value were blocked because of a defective component. According to the invention, these functions are likewise made available in the central function so that the question as to which diagnostic functions are checked for the specific engine as to their running capability can continue to be very flexibly handled.

In a further embodiment, a change of the third count value is blocked in the central function if it is determined that a component is defective which is needed in order to detect whether the specific operating conditions are present. In this way, the reliability with respect to the judgment of the running capability of a diagnostic function is improved. In this way, the fact is taken into consideration that the reliability with which the presence of the specific operating conditions is determined can be limited when the signal of a component, which is necessary for the determination of the specific operating conditions, is burdened with a defect. This functionality is made available in the central function and this increases the flexibility of the total method.

Furthermore, a fourth count value is determined in the cental function which is based on the number of starts of the engine. This, too, makes possible a relativization of the first to third count values and therewith an improvement of their force of statement. This function is also accommodated in the central function in accordance with the invention and therewith is independent of the number and type of diagnostic functions.

The content of the records is inquired of in the central function in a specific and relatively slow computation raster and the corresponding count values are determined and stored. The count values are specific and correspond for the particular diagnostic function. In this way, computation capacity is saved so that this is available for other functions.

An essential background for the check of the running capability of a diagnostic function is the requirement that the result of the check can be read out from an external inquiry apparatus. This is taken into account in that, when an external inquiry apparatus is connected, the central function outputs that quotient from the particular first and second count values of a plurality of diagnostic functions which exhibits the lowest value, and the quotient and an information are transmitted to the external inquiry apparatus. From this information, it is evident which diagnostic function the quotient is assigned to. The determination of the quotient normally takes place continuously in order to always have the same available, however, this takes place in a slow computation raster.

The invention relates also to a computer program for carrying out the method of the invention and is stored on a memory medium. The subject matter of the present invention is also a storage medium for a control apparatus of an internal combustion engine on which a computer program of the above kind is stored.

Furthermore, a control apparatus (open loop and/or closed loop) for an engine is disclosed which is programmed for application in a method of the above type.

The subject matter of the invention is also an internal combustion engine, especially for a motor vehicle having a control apparatus (open loop and/or closed loop) which is programmed for the application in a method of the above type.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
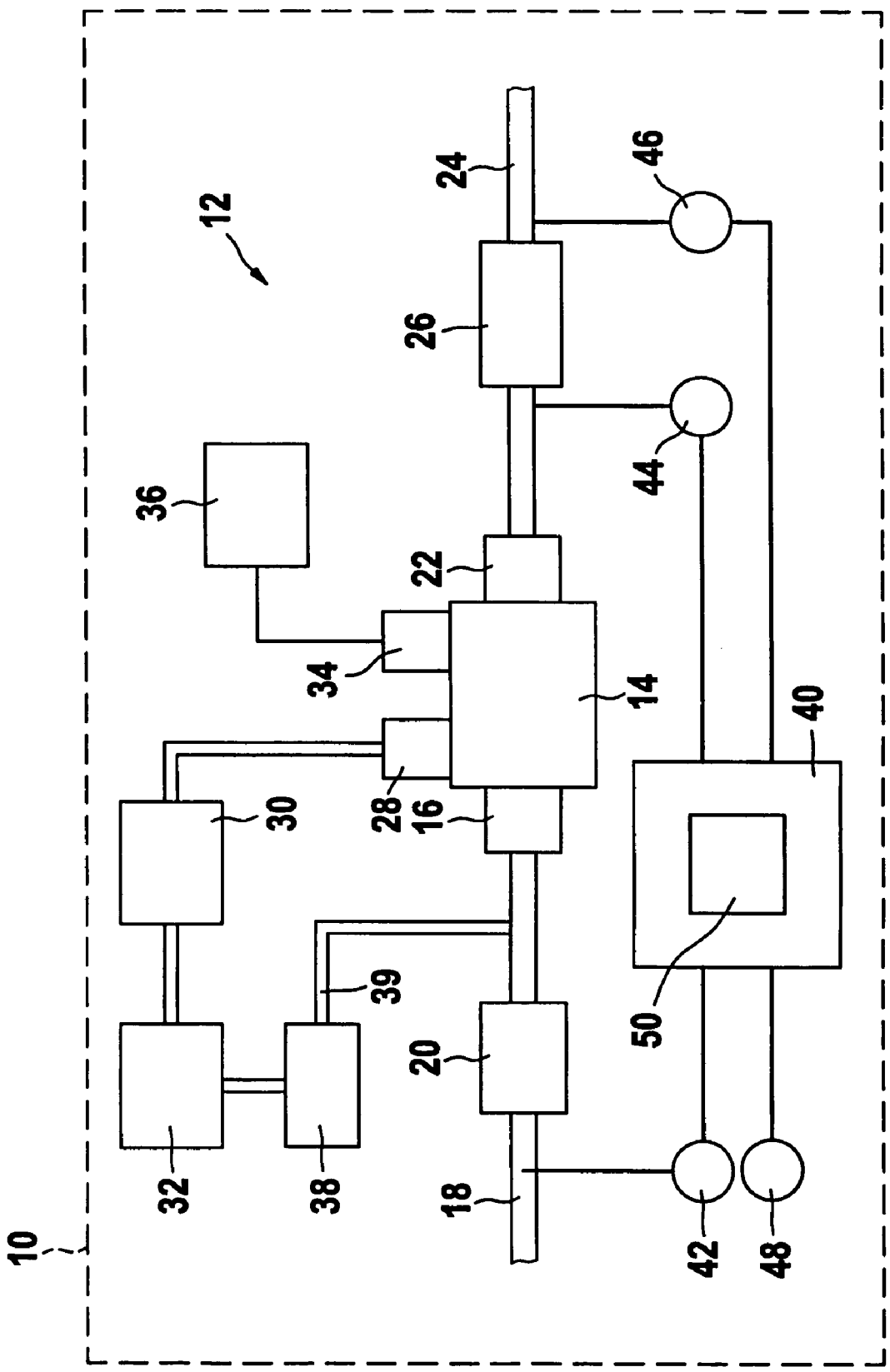
FIG. 1 is a schematic of a motor vehicle having an internal combustion engine; and, FIG. 2 is a flowchart showing a method for operating a motor vehicle and the internal combustion engine of FIG. 1.

In FIG. 1, a motor vehicle is identified by reference numeral 10. The vehicle is indicated in FIG. 1 only schematically by a broken line. The motor vehicle 10 is driven by an internal combustion engine 12. The engine is likewise shown only schematically in FIG. 1 and not all components are shown.

The internal combustion engine 12 includes several cylinders of which only one is shown having a combustion chamber 14. The air, which is required for the combustion, reaches the combustion chamber 14 via an inlet valve 16 and intake manifold 18. A throttle flap 20 makes possible an adjustment of the combustion air reaching the combustion chamber 14. The hot combustion gasses are directed away from the combustion chamber 14 via an outlet valve 22 and an exhaust-gas pipe 24. A catalytic converter 26 is mounted in the exhaust-gas pipe 24.

In the present embodiment, fuel is conducted directly to the combustion chamber 14 via an injector 28 (here, it is understood that the method described hereinafter can also be applied for intake manifold injection). The injector 28 receives the fuel from a fuel system 30 which moves the fuel out of a fuel tank 32. The air/fuel mixture, which is generated in the combustion chamber 14, is ignited by a spark plug 34 which is driven by an ignition system 36.

The fuel tank 32 is connected to a venting valve 38 in order to reduce the load on the environment because of fuel vapors. Via the venting valve 38, the fuel vapors can be conducted from the fuel tank 32 into the intake manifold 18. The corresponding connection is identified by reference numeral 39. The venting valve 38 is driven by a control apparatus 40. Because of reasons of clarity, the control lines between the venting valve 38 and the control apparatus (open loop and/or closed loop) 40 are not shown.

The air quantity flowing through the intake manifold 18 is detected by an air mass sensor 42. The composition of the air/fuel mixture is detected by two lambda probes 44 and 46 which are arranged at the input and at the output of the catalytic converter 26, respectively. The speed of the vehicle 10 is detected by a speed sensor 48. The sensors (42, 44, 46, 48) supply respective signals to the control apparatus 40.

The correct function of individual components or of the engine 12 of the vehicle, for example, the catalytic converter 26, are diagnosed again and again. A statutory requirement of the California Air Resource Board (CARB), however, also requires that specific components of a motor vehicle or of an internal combustion engine are not only actually diagnosed but that it is also documented as to whether the corresponding diagnostic function could have found a fault even when actually no defect was present. Especially the operational reliability of environmentally-critical components of a motor vehicle or of an internal combustion engine should be increased in this manner.

The statutory regulation requires for this purpose that a ratio is formed known as "IUMPR". This in-use-monitor-performance-ratio sets a numerator to a denominator in a ratio. The numerator is based on the number of possible runs of a diagnostic function during operation, the denominator on the number of specific operating conditions, which were present during operation of the motor vehicle or of the internal combustion engine. For the generalized operating conditions, a specific frequency is expected that a fault can be found for the runthrough of a diagnosis of a component. In the present embodiment, one proceeds from the situation that the specific operating conditions should have been present: when the motor vehicle 10 or the internal combustion engine 12 has been in operation for at least 600 seconds; when the vehicle 10 exhibited a speed of more than 25 mph during a time span of 300 seconds; and, when the engine 12 has been operated at idle at least once during a time span of 30 seconds at a time.

The statutory requirements are satisfied in the motor vehicle 10 shown in FIG. 1 and for the engine 12 by a method which is explained in detail in connection with FIG. 2. The method is explained by way of example for the diagnosis of the catalytic converter 26 and for the diagnosis of the speed sensor 48. It is understood that the given method can, however, be utilized in the same way for the diagnostic functions of a plurality of other components and sensors. The described method is presented here in the form of a computer program which is stored in a memory 50 of the control apparatus 40.

Figure 2:
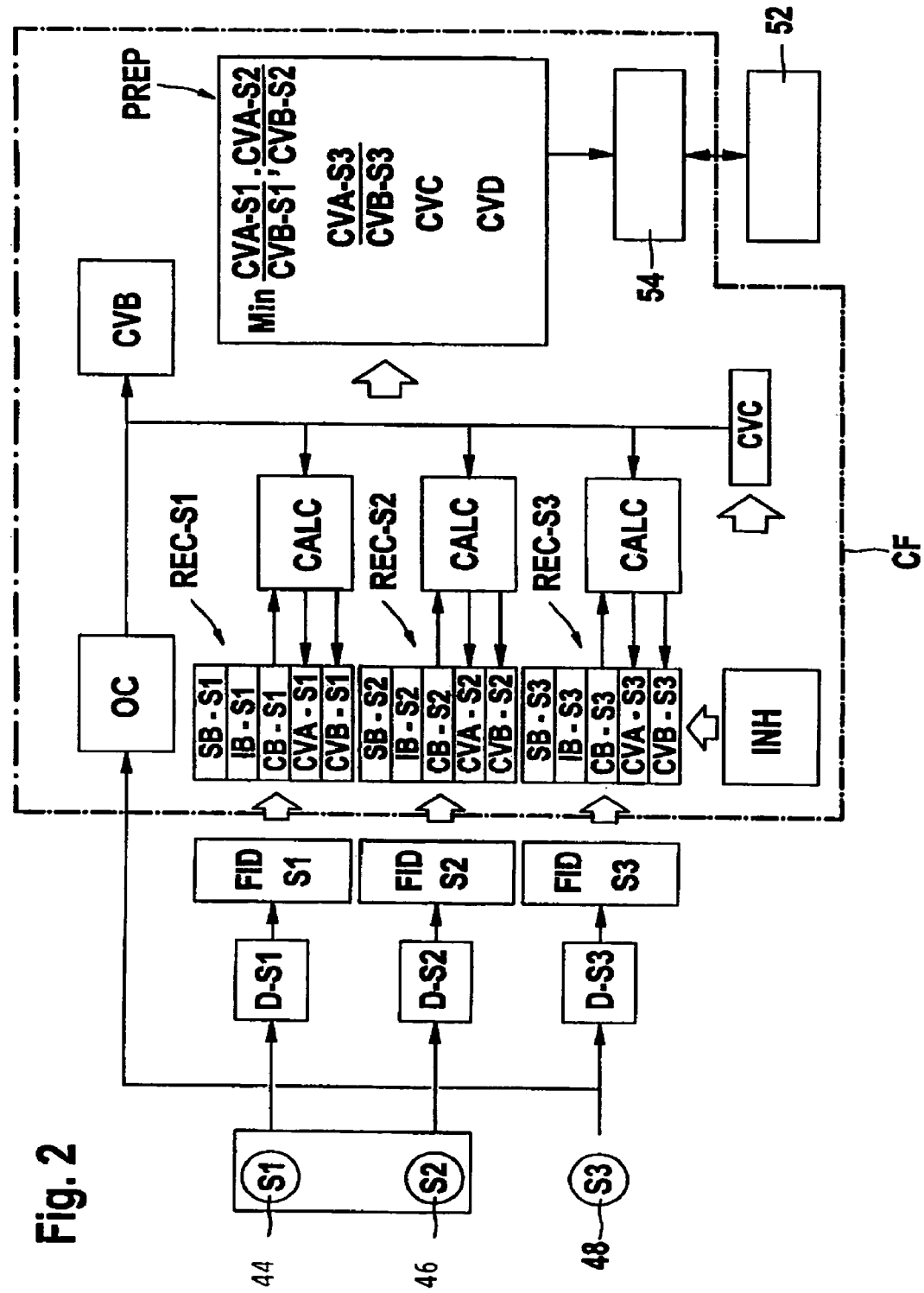

The catalytic converter 26 is indicated by a broken line in FIG. 2. A correct function of the catalytic converter 26 is determined by means of the lambda probes 44 and 46. It is a condition precedent that there is a correct function of the two lambda probes 44 and 46 (these are identified in FIG. 2 also by S1 and S2). The operability of the lambda probes is monitored by diagnostic functions D-S1 and D-S2. Furthermore, the operability of the speed sensor 48 (sensor S3) is monitored by a diagnostic function D-S3.

The diagnostic functions D-S1, D-S2 and D-S3 are implemented as independent functions. Diagnoses of components are, on the one hand, possible via an observing evaluation of the normal drive which is possible for confirming a correct functioning of a component. Another possibility of the diagnosis can, however, also be realized in a targeted driving of a component and the evaluation of the reaction in an otherwise undisturbed system. In this way, a defective function of a component can be detected in a targeted manner. The method of FIG. 2 is concerned with a second mentioned form of diagnostic functions.

The determination whether one of the diagnostic functions D-S1, D-S2 and D-S3 could have run is made in the diagnostic functions themselves. The data are then transmitted to a so-called central function wherein these data are correspondingly processed.

The central function is indicated in FIG. 2 by the bold broken line and is identified by the reference character CF. The diagnostic functions D-S1, D-S2 and D-S3 communicate with the central function CF via an interface IF wherein the diagnostic functions announce themselves with a so-called "function identifier" characterized by FID-S1, FID-S2 and FID-S3. These function identifiers FID are the same with respect to their structural configuration for all diagnostic functions D-S1, D-S2 and D-S3.

For each diagnostic function D-S1, D-S2 and D-S3, which is identified at the central function CF at the interface IF, the central function CF establishes a record. These are identified in FIG. 2 by REC-S1, REC-S2 and REC-S3. In the embodiment shown in FIG. 2, a record REC includes a status bit SB for each diagnostic function via which the result of the last executed diagnosis is indicated. Furthermore, in the record, a block bit IB is stored via which the central function CF indicates to a diagnostic function D whether the diagnostic function D is blocked or not. This will be explained in greater detail hereinafter. A further component of a record REC is a confirmation bit CB via which a diagnostic function D indicates to the central function CF that it would have been able to be carried out.

What is important in this case is that the central function CF at first does not need any data as to the type and/or the number of the available diagnostic functions D. In the central function CF, corresponding records REC are established basically for all diagnostic functions D which announce themselves to the central function CF via the interface IF (and, if required, via a specified parameter). It is also noted that the data of the individual diagnostic functions D are transmitted to the central function CF in a format uniform for all diagnostic functions D.

An essential element of the central function CF is the block INH. With this block INH, the block bits IB are generated within the central function CF which are stored in the record REC of a diagnostic function D. The block INH processes actual diagnostic results. If it is determined that a component, which is required for the execution of a specific diagnostic function D, is defective, the corresponding diagnostic function D is blocked by setting the corresponding block bit SB.

However, it is also possible, that the block INH functions as part of a sequence control which is not shown in FIG. 2. With such a sequence control, the time-dependent run of the individual diagnostic functions is managed. In this way, the fact is taken into account that specific diagnostic functions may not run simultaneously. One example for this is the diagnosis of the catalytic converter 26 or of the lambda probes 44 and 46. For a diagnosis of this kind, substantially steady-state operating conditions of the engine 12 are required. For a diagnosis of the venting valve 38 of the fuel vessel 32, fuel vapor, however, is introduced into the intake manifold 18 which leads to a change of the mixture composition in the combustion chamber 14 and to conditions unsuitable for the check of the catalytic converter 26. The diagnosis of the venting valve 38, on the one hand, and the catalytic converter 26, on the other hand, is therefore not simultaneously possible. This case of incompatibility/exclusion between individual runs can be interpreted as a blocking of a kind. This type of interaction is only applied for the blocking or enabling of the sequences but not for the counter. The communication takes place also in this case via the central interface.

In the central function CF, it is further detected whether the specific operating conditions of the motor vehicle 10 and of the internal combustion engine 12 have been present which are a precondition for the run of the diagnostic functions. These operating conditions are explained above. In this way, it is documented that a correct and meaningful result is in principle expected from specific diagnostic functions when these generally specified conditions have been present during a drive. To determine the actual drive profile, signals of the speed sensor 48 (which is identified in FIG. 2 by S3) are stored in a processing block OC which is likewise part of the central function CF. In the processing block OC, it is determined whether such generalized driving conditions have been present.

The data from the processing block OC and the data as to whether the diagnoses D-S1, D-S2 or D-S3 would have been able to be carried out (bit CB-S1, CB-S2, CB-S3) are processed in a comparatively very slow computer raster in computation blocks CALC. This leads to the situation that count values CVA and CVB are incremented in the records REC of each diagnostic function D-S1, D-S2 and D-S3 if no block is present because of a block bit IB (a record therefore includes also the count values CVA and CVB; there are, however, still other data in a record possible). The count values CVA are based on the number of possible runs of the diagnostic functions D; whereas, the count values CVB are based on the number of general drive conditions which were actually present. However, when a block bit IB is set in a record REC, the actual execution of the diagnostic function D is, on the one hand, blocked and, on the other hand, the incrementation of the count values CVA and CVB is blocked.

In the central function CF, two further common values are determined: on the one hand, a count value CVC and a count value CVD. Both are the result of operations in the processing block OC. The count value CVC is based again on the number of general drive conditions which have been actually present. As a difference to the count value CVB, the incrementation of the count value CVC is, however, only blocked by the block INH when it was determined that a component is defective which is necessary in order to detect whether the specific operating conditions or the general drive conditions have been present. This would, for example, be a defect of the speed sensor 48 or S3. The count value CVD is the number of starts of the internal combustion engine 12.

The target of the central function CF is to document the possibilities, which were present in the past, for carrying out a diagnostic function D. The corresponding functionality is realized by means of a preparation block PREP. In this block PREP, first the quotients CVA-S1/CVB-S1 and CVA-S2/CVB-S2 are formed. Then, the smaller of the two quotients is selected and is, if a tester 52 is connected to an interface 54, transmitted to the interface 54. Furthermore, the quotient CVA-S3/CVB-S3 is formed. This quotient is likewise transmitted to the interface 54 as the count values CVC and CVD.

Here, it is to be noted that for each diagnostic function D, it is documented as to which component system it is assigned to. Accordingly, it is known that the diagnostic functions D-S1 and D-S2 are assigned to the catalytic converter 26. With the above-described minimum value formation, the diagnostic function D is selected for this component, namely, the catalytic converter 26, which has shown the weakest run performance.

It is understood that the foregoing description is that of the preferred embodiments of the invention and that various changes and modifications may be made thereto without departing from the spirit and scope of the invention as defined in the appended claims.

What is claimed is:

1. A method for operating an internal combustion engine including an internal combustion engine of a motor vehicle, the method comprising the steps of:
   checking the operability of at least one component by a diagnostic function (D);
   causing said diagnostic function (D) to transmit data (CB) that said diagnostic function (D) could have found a fault to a central function (CF) in a format uniform for all diagnostic functions (D); and,
   causing said central function (CF) to process said data (CB),
   wherein each of said diagnostic functions (D) communicates with the central function (CF) via an interface (IF); and, the central function (CF) establishes for each diagnostic function (D), which identifies itself to said central function (CF) at said interface (FID), a region (REC) of a suitable data structure wherein data for the diagnostic function (D) and
   the following: an identifier (S) of the diagnostic function (D), data (CB) as to whether the diagnostic function (D) could have run and data (IB) as to whether the diagnostic function (D) is blocked or can run are stored.

2. The method of claim 1, wherein the content of the region (REC) of the suitable data structure is inquired of in the central function (CF) in a specific computation raster (CALC) which is slow relative to other functions and corresponding numerical values (CVA, CVB) are determined and stored, with these numerical values (CVA, CVB) being specific to the particular diagnostic function (D).

3. A method for operating an internal combustion engine including an internal combustion engine of a motor vehicle, the method comprising the steps of:
   checking the operability of at least one component by a diagnostic function (D);
   causing said diagnostic function (D) to transmit data (CB) that said diagnostic function (D) could have found a fault to a central function (CF) in a format uniform for all diagnostic functions (D); and,
   causing said central function (CF) to process said data (CB),
   wherein the central function (CF) detects whether specific operating conditions of the internal combustion engine are satisfied whereat the running of the diagnostic function (D) is expected with a certain frequency of occurrence and wherein the central function (CF) determines a first numerical value (CVA) which is based on a number of possible executions of the diagnostic function (D) and determines a second numerical value (CVB) which is based on the number of specific operating conditions which have actually been present.

4. The method of claim 3, wherein the central function (CF) blocks an execution of the diagnostic function (D) and a change of the second numerical value (CVB) by a common functionality (INH) when a component (S2, S3) is defective, the component (S2, S3) being necessary for achieving a purposeful diagnostic result.

5. A method for operating an internal combustion engine including, an internal combustion engine of a motor vehicle, the method comprising the steps of:
   checking the operability of at least one component by a diagnostic function (D);
   causing said diagnostic function (D) to transmit data (CB) that said diagnostic function (D) could have found a fault to a central function (CF) in a format uniform for all diagnostic functions (D); and,
   causing said central function (CF) to process said data (CB),
   wherein a third numerical value (CVC) is determined in the central function (CF), said numerical value (CVC) being based on a number of specific operating conditions which actually were present.

6. The method of claim 5, wherein a change of the third numerical value (CVC) is blocked in the central function (CF) if it is determined that a component (S3) is defective which is necessary in order to detect whether the specific operating conditions were present.

7. A method for operating an internal combustion engine including an internal combustion engine of a motor vehicle, the method comprising the steps of:
   checking the operability of at least one component by a diagnostic function (D);
   causing said diagnostic function (D) to transmit data (CB) that said diagnostic function (D) could have found a fault to a central function (CF) in a format uniform for all diagnostic functions (D); and,
   causing said central function (CF) to process said data (CB),
   wherein a fourth numerical value (CVD) is determined in the central function (CF) which is based on the number of starts of the internal combustion engine.

8. A method for operating an internal combustion engine including an internal combustion engine of a motor vehicle, the method comprising the steps of:
   checking the operability of at least one component by a diagnostic function (D);
   causing said diagnostic function (D) to transmit data (CB) that said diagnostic function (D) could have found a fault to a central function (CF) in a format uniform for all diagnostic functions (D); and,
   causing said central function (CF) to process said data (CB),
   wherein, when an external inquiry apparatus is connected, in the central function (CF), that quotient (MIN) from a particular first numerical value (CVA) and a particular second numerical value (CVB) of a plurality of diagnostic functions (D) is outputted, which has the lowest value; and, the quotient (MIN) and the data, from which it becomes apparent to which diagnostic function (D) the quotient (MIN) is allocated, are transmitted to the external inquiry apparatus.

* * * * *